US006813702B1

(12) United States Patent
Ramey et al.

(10) Patent No.: US 6,813,702 B1
(45) Date of Patent: Nov. 2, 2004

(54) METHODS AND APPARATUS FOR GENERATING EFFECTIVE TEST CODE FOR OUT OF ORDER SUPER SCALAR MICROPROCESSORS

(75) Inventors: Carl Geisler Ramey, Cambridge, MA (US); Daniel Lawrence Leibholz, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/106,691

(22) Filed: Jun. 29, 1998

(51) Int. Cl.[7] .............................................. G06F 9/22
(52) U.S. Cl. ........................................ 712/23; 717/106
(58) Field of Search ............................ 712/23; 717/106

(56) References Cited

U.S. PATENT DOCUMENTS

| | | | |
|---|---|---|---|
| 5,483,470 A | * 1/1996 | Alur et al. ...................... | 716/6 |
| 5,615,167 A | 3/1997 | Jain et al. .............. | 365/230.08 |
| 5,864,660 A | * 1/1999 | Hamameh et al. ............ | 714/32 |
| 5,870,619 A | * 2/1999 | Wilkinson et al. ............ | 712/20 |

OTHER PUBLICATIONS

"Digital to Break 1,000 MHz Barrier with High–Powered New Generation of Alpha Architecture", Press Release: Alpha 21264, Feb. 2, 1998.

"The 21264: A Superscalar Alpha Processor with Out–of–Order Execution", http://www.digital.com/info/semiconductor/a264up1/index.html (1998).

Gwennap, L., "Digital 21264 Sets New Standard", *MicroDesign Resources*, Oct. 28, 1996.

* cited by examiner

Primary Examiner—David Y. Eng

(57) ABSTRACT

A technique for producing a test executable in a computer. The technique involves forming multiple instruction streams. The technique further involves dividing the multiple instruction streams into portions, and generating a combined instruction stream having the portions interleaved. Additionally, the technique involves creating a test executable from the combined instruction stream. The test executable can be used for testing a simulated processor in a computer. In particular, the test executable is loaded. Then, the test executable is run through the simulated processor to generate processor results and through a reference model to generate reference results. The processor results and the reference results are compared to determine whether the simulated processor operates correctly.

18 Claims, 9 Drawing Sheets

STREAM A

| INST. # | OP | SRC 0 | SRC 0 | DEST. |
|---|---|---|---|---|
| 1 | OP | R07, | R08, | R01 |
| 2 | OP | R08, | R01, | R02 |
| 3 | OP | R01, | R02, | R03 |
| 4 | OP | R02, | R03, | R04 |
| 5 | OP | R03, | R04, | R05 |
| 6 | OP | R04, | R05, | R06 |
| 7 | OP | R05, | R06, | R07 |
| 8 | OP | R06, | R07, | R08 |
| 9 | OP | R07, | R08, | R01 |
| 10 | OP | R08, | R01, | R02 |
| ⋮ | ⋮ | ⋮ | ⋮ | ⋮ |

STREAM B

| INST. # | OP | SRC 0 | SRC 0 | DEST. |
|---|---|---|---|---|
| 1 | OP | R15, | R16, | R09 |
| 2 | OP | R16, | R09, | R10 |
| 3 | OP | R09, | R10, | R11 |
| 4 | OP | R10, | R11, | R12 |
| 5 | OP | R11, | R12, | R13 |
| 6 | OP | R12, | R13, | R14 |
| 7 | OP | R13, | R14, | R15 |
| 8 | OP | R14, | R15, | R16 |
| 9 | OP | R15, | R16, | R09 |
| 10 | OP | R16, | R09, | R10 |
| ⋮ | ⋮ | ⋮ | ⋮ | ⋮ |

STREAM C

| INST. # | OP | SRC 0 | SRC 1 | DEST. |
|---|---|---|---|---|
| 1 | OP | R23, | R24, | R17 |
| 2 | OP | R24, | R17, | R18 |
| 3 | OP | R17, | R18, | R19 |
| 4 | OP | R18, | R19, | R20 |
| 5 | OP | R19, | R20, | R21 |
| 6 | OP | R20, | R21, | R22 |
| 7 | OP | R21, | R22, | R23 |
| 8 | OP | R22, | R23, | R24 |
| 9 | OP | R23, | R24, | R17 |
| 10 | OP | R24, | R17, | R18 |
| ⋮ | ⋮ | ⋮ | ⋮ | ⋮ |

STREAM D

| INST. # | OP | SRC 0 | SRC 1 | DEST. |
|---|---|---|---|---|
| 1 | OP | R31, | R32, | R25 |
| 2 | OP | R32, | R25, | R26 |
| 3 | OP | R25, | R26, | R27 |
| 4 | OP | R26, | R27, | R28 |
| 5 | OP | R27, | R28, | R29 |
| 6 | OP | R28, | R29, | R30 |
| 7 | OP | R29, | R30, | R31 |
| 8 | OP | R30, | R31, | R32 |
| 9 | OP | R31, | R32, | R25 |
| 10 | OP | R32, | R25, | R26 |
| ⋮ | ⋮ | ⋮ | ⋮ | ⋮ |

FIG. 3

COMBINED STREAM

| INST. # | OP | SRC 0 | SRC 0 | DEST. |
|---|---|---|---|---|
| 1  | OP | R07, | R08, | R01 |
| 2  | OP | R08, | R01, | R02 |
| 3  | OP | R01, | R02, | R03 |
| 4  | OP | R02, | R03, | R04 |
| 5  | OP | R03, | R04, | R05 |
| 6  | OP | R15, | R16, | R09 |
| 7  | OP | R16, | R09, | R10 |
| 8  | OP | R09, | R10, | R11 |
| 9  | OP | R10, | R11, | R12 |
| 10 | OP | R11, | R12, | R13 |
| 11 | OP | R23, | R24, | R17 |
| 12 | OP | R24, | R17, | R18 |
| 13 | OP | R17, | R18, | R19 |
| 14 | OP | R18, | R19, | R20 |
| 15 | OP | R19, | R20, | R21 |
| 16 | OP | R31, | R32, | R25 |
| 17 | OP | R32, | R25, | R26 |
| 18 | OP | R25, | R26, | R27 |
| 19 | OP | R26, | R27, | R28 |
| 20 | OP | R27, | R28, | R29 |
| ⋮ | ⋮ | ⋮ | ⋮ | ⋮ |

FIG. 4

AFTER FIRST FETCH

| ISSUE QUEUE POS. | INST. # | OP | SRC | SRC | DEST. | TIME ----------><br>0 1 2 3 4 5 6 7 8 9 |
|---|---|---|---|---|---|---|
| 1 | 1 | OP | R07, | R08, | R01 | F I E R |
| 2 | 2 | OP | R08, | R01, | R02 | F I E R |
| 3 | 3 | OP | R01, | R02, | R03 | F I E R |
| 4 | 4 | OP | R02, | R03, | R04 | F I E R |

FIG. 6A

AFTER SECOND FETCH

| ISSUE QUEUE POS. | INST. # | OP | SRC | SRC | DEST. | TIME ----------><br>0 1 2 3 4 5 6 7 8 9 |
|---|---|---|---|---|---|---|
| 1 | 2 | OP | R08, | R01, | R02 | F I E R |
| 2 | 3 | OP | R01, | R02, | R03 | F I E R |
| 3 | 4 | OP | R02, | R03, | R04 | F I E R |
| 4 | 5 | OP | R03, | R04, | R05 | F I E R |
| 5 | 6 | OP | R15, | R16, | R09 | F I E R |
| 6 | 7 | OP | R16, | R09, | R10 | F I E R |
| 7 | 8 | OP | R09, | R10, | R11 | F I E R |

FIG. 6B

AFTER THIRD FETCH

| ISSUE QUEUE POS. | INST. # | OP | SRC 0 | SRC 0 | DEST. |
|---|---|---|---|---|---|
| 1 | 3 | OP | R01, | R02, | R03 |
| 2 | 4 | OP | R02, | R03, | R04 |
| 3 | 5 | OP | R03, | R04, | R05 |
| 4 | 7 | OP | R16, | R09, | R10 |
| 5 | 8 | OP | R09, | R10, | R11 |
| 6 | 9 | OP | R10, | R11, | R12 |
| 7 | 10 | OP | R11, | R12, | R13 |
| 8 | 11 | OP | R23, | R24, | R17 |
| 9 | 12 | OP | R24, | R17, | R18 |

TIME ---->
```
     0 1 2 3 4 5 6 7 8 9
     |
     F   I E R
     F     I E R
           F I E R
           F   I E R
               F I E R
               F   I E R
                   F I E R
```

FIG. 6C

AFTER FORTH FETCH

| ISSUE QUEUE POS. | INST. # | OP | SRC 0 | SRC 0 | DEST. |
|---|---|---|---|---|---|
| 1 | 4 | OP | R02, | R03, | R04 |
| 2 | 5 | OP | R03, | R04, | R05 |
| 3 | 8 | OP | R09, | R10, | R11 |
| 4 | 9 | OP | R10, | R11, | R12 |
| 5 | 10 | OP | R11, | R12, | R13 |
| 6 | 12 | OP | R24, | R17, | R18 |
| 7 | 13 | OP | R17, | R18, | R19 |
| 8 | 14 | OP | R18, | R19, | R20 |
| 9 | 15 | OP | R19, | R20, | R21 |
| 10 | 16 | OP | R31, | R32, | R25 |

TIME ---------->
0 1 2 3 4 5 6 7 8 9

| INST. # | OP | SRC 0 | SRC 0 | DEST. | TIME 0 1 2 3 4 5 6 7 8 9 10 11 12 13 14 |
|---|---|---|---|---|---|
| 1 | OP | R07, | R08, | R01 | F I E R |
| 2 | OP | R08, | R01, | R02 | F I E R |
| 3 | OP | R01, | R02, | R03 | F I E R |
| 4 | OP | R02, | R03, | R04 | F F I E R |
| 5 | OP | R03, | R04, | R05 | F F I E R |
| 6 | OP | R15, | R16, | R09 | F F F I E R |
| 7 | OP | R16, | R09, | R10 | F F F I E R |
| 8 | OP | R09, | R10, | R11 | F F F I E R |
| 9 | OP | R10, | R11, | R12 | F F F I E R |
| 10 | OP | R11, | R12, | R13 | F F F I E R |
| 11 | OP | R23, | R24, | R17 | F F F I E R |
| 12 | OP | R24, | R17, | R18 | F F F I E R |
| 13 | OP | R17, | R18, | R19 | F F F I E R |
| 14 | OP | R18, | R19, | R20 | F F F I E R |
| 15 | OP | R19, | R20, | R21 | F F F I E R |
| 16 | OP | R31, | R32, | R25 | F F F I E R |
| 17 | OP | R32, | R25, | R26 | F F F I E R |
| 18 | OP | R25, | R26, | R27 | F F F I E R |
| 19 | OP | R26, | R27, | R28 | F F F I E R |
| 20 | OP | R27, | R28, | R29 | F F F I E R |

METHODS AND APPARATUS FOR GENERATING EFFECTIVE TEST CODE FOR OUT OF ORDER SUPER SCALAR MICROPROCESSORS

FIELD OF THE INVENTION

This invention relates generally to data processing and in particular to data processor testing.

BACKGROUND OF THE INVENTION

The process of designing a data processor typically includes testing for design flaws at various stages of development. Such testing often involves running one or more test executables through a processor simulation system during a processor simulation stage of development, or through an actual processor in semiconductor form after a fabrication stage. In general, these test executables attempt to stress particular circuits and features of the processor.

A superscaler processor is a processor that is capable of executing multiple instructions simultaneously. Such processors typically include an execution stage having multiple execution units (execution circuits), each of which can execute an instruction independently of other execution units. Designers typically test superscaler processors using test executables created from source code having few or no instruction dependencies, or source code having weak instruction dependencies.

An instruction dependency (also referred to as a data hazard) exists when two instructions attempt to access the same register. The strongest type of instruction dependency is a read-after-write (RAW) dependency in which an initial instruction writes a result to a register and a subsequent instruction reads the result from that register. The subsequent instruction must wait until the initial instruction completes writing the result before it can read the result. The weakest type of instruction dependency is a read-after-read (RAR) dependency which involves two instructions attempting to read from the same register. Other types of instruction dependencies include write-after-read (WAR) and write-after-write (WAW) dependencies.

Instruction streams with weak instruction dependencies or no instruction dependencies stress the multiple execution capabilities of superscaler processors since there is little or no need to delay the instructions of such streams. Accordingly, instructions generally can execute as soon as an execution unit becomes available.

Stream #1, as shown below, includes no instruction dependencies, and stresses the multiple issue feature of superscaler processors.

| Inst. # | OP | SRC 0 | SRC 1 | DEST. |
|---|---|---|---|---|
| | | STREAM #1 | | |
| 1 | addq | R01, | R02, | R03 |
| 2 | subl | R04, | R05, | R06 |
| 3 | addq | R07, | R08, | R09 |
| 4 | subl | R10, | R11, | R12 |

Instruction 1 adds the contents of source register R01 to source register R02, and stores the result in destination register R03. Instruction 2 subtracts the contents of R04 from R05, and stores the result in R06. Instruction 3 adds the contents of R07 to register R08, and stores the result in R09. Instruction 4 subtracts the contents of R10 from R11, and stores the result in R12. Since none of the instructions access the same registers, there are no instruction dependencies. Accordingly, subsequent instructions do not need to be delayed while earlier instructions complete, and instructions may issue as soon as execution units become available to execute them. As a result, the execution units of the superscaler processor are consistently kept busy. For these reasons, designers of superscaler processors often create large executables similar to Stream #1, and use such executables to test the superscalar capabilities of their processor designs.

Another type of processor is called an out-of-order processor. An out-of-order processor is a processor that obtains instructions in a program order, and that is capable of executing instructions in an order that is different than the program order (i.e., capable of executing instructions out-of-order). Such processors typically include an issue queue that queues the instructions obtained in program order, and that is capable of issuing instructions out-of-order when instruction dependencies require that the processor delay issuance of instructions next in line. Designers typically test out-of order processors using a test executable created from source code having a large number of instructions with strong dependencies.

Stream #2 includes instructions with strong dependencies, and stresses the out-of-order issue feature of out-of-order processors.

| Inst. # | OP | SRC 0 | SRC 1 | DEST. |
|---|---|---|---|---|
| | | STREAM #2 | | |
| 1 | addq | R01, | R02, | R03 |
| 2 | subl | R03, | R04, | R05 |
| 3 | addq | R03, | R06, | R07 |
| 4 | subl | R08, | R09, | R10 |

Instruction 1 adds the contents of source register R01 to source register R02, and stores the result in destination register R03. Instruction 2 subtracts the contents of R03 from R04, and stores the result in R05. Instruction 3 adds the contents of R03 to R06, and stores the result in R07. Instruction 4 subtracts the contents of R08 from R09, and stores the result in R10. Since Instruction 1 stores its result in R03 and each of the Instructions 2 and 3 reads from R03, Instructions 2 and 3 having instruction dependencies with Instruction 1. Accordingly, Instructions 2 and 3 cannot issue until Instruction 1 stores its result. In contrast, Instruction 4 can issue at any time relative to Instructions 1, 2 or 3 since Instruction 4 does not access any registers that are accessed by the other instructions. Accordingly, an out-of-order processor may issue Instruction 1, and subsequently issue Instruction 4 prior to issuing Instructions 2 and 3. For these reasons, designers of out-of-order processors often create large executables from instruction streams similar to Stream #2 to cause instructions to issue out-of-order, and then use such executables to stress the out-of-order capabilities of their processor designs.

Some processors include both superscaler and out-of-order features. The superscaler feature of such a processor can be tested by running a test executable having instructions without dependencies similar to that of Stream #1 (shown above). Additionally, the out-of-order feature can be tested by running another test executable having instructions with dependencies similar to that of Stream #2 (shown above).

SUMMARY OF THE INVENTION

Stream #1, shown above, may stress a processor's superscaler capabilities, but does not stress the processor's out-of-order capabilities simultaneously. Similarly, Stream #2, shown above, may stress a processor's out-of-order capabilities, but does not stress the processor's superscaler capabilities simultaneously. Unfortunately, many design problems in complex processors will only be discovered when multiple processor features are stressed simultaneously.

A stream suitable for testing a processor's superscaler capabilities with few or no dependencies (e.g., Stream #1 above) can be modified by introducing strong instruction dependencies, e.g., read-after-write (RAW) dependencies. However, increasing the number of RAW instruction dependencies reduces the number of independent instructions (instructions without dependencies) within the stream. That is, the resulting stream may improve the stream's opportunity to cause an out-of-order execution, but such a stream may no longer be able to consistently stress the superscaler structures of the processor. Accordingly, some execution units may become idle and the throughput of the processor will decrease.

An embodiment of the invention is directed to a technique that can produce, in a computer, a test executable that can simultaneously test the superscaler and out-of-order capabilities of a processor. The technique involves forming multiple instruction streams, dividing the multiple instruction streams into portions, and generating a combined instruction stream having the portions interleaved. The technique further involves creating a test executable from the combined instruction stream.

Formation of multiple instruction streams preferably involves constructing the multiple instruction streams such that the multiple instruction streams access different groups of registers. Each instruction stream can provide instructions with strong dependencies for testing the out-of order capabilities of the processor. Additionally, the instructions within any particular stream are independent of the instructions of the other streams such that multiple execution units of the processor can be consistently kept busy.

Construction of the multiple instruction streams may involve operating a code generator such that the code generator provides each of the multiple instruction streams. Alternatively, such construction may involve operating a code generator such that the code generator provides a particular instruction stream, and forming other instruction streams according to the particular instruction stream.

To divide the streams into portions and generate a combined instruction stream having the stream portions, the technique may involve interleaving the portions within the combined instruction stream such that the portions alternate in a round-robin manner. Alternatively, the technique may involve interleaving the portions within the combined instruction stream such that the portions alternate in a pseudo random manner. Interleaving in a pseudo random manner may introduce nuances within the instruction stream that uncover design flaws that would otherwise be undetected.

Additional nuances within the instruction stream can be introduced in other ways, as well. In particular, the technique may further involve, prior to creating the test executable, including conflict instructions (e.g., instructions that cause conflicts) within the combined instruction stream. For example, LOAD instructions that cause cache misses may be included within the instruction stream to purposefully stall instructions with dependencies within the instruction stream. The LOAD instructions would more fully stress the processor's out-of-order capabilities by adding delays to particular instructions depending on the LOAD instructions.

Furthermore, the formation of the multiple instruction streams may involve constructing the multiple instruction streams such that the multiple instruction streams communicate with each other. In particular, the multiple instruction streams can be formed such that they access common registers. Additionally, the multiple instruction streams can be formed such that they share common memory spaces. The sharing of common registers or memory spaces enhances the breadth of the processor test by also testing interstream communication aspects of the processor.

Another embodiment of the invention is directed to a simulation system for testing a simulated processor. The system includes an input that receives a test executable created from a combined instruction stream having interleaved portions of multiple instruction streams. The system further includes a processor simulator, coupled to the input, that runs the test executable to generate processor results. Additionally, the system includes a reference model, coupled to the input, that runs the test executable to generate reference results. Furthermore, the system includes a compare module, coupled to the processor simulator and the reference model, that compares the processor results and the reference results to determine whether the simulated processor operates correctly. The system simultaneously stresses the superscaler and out-of-order capabilities of the processor simulator such that design flaws can be detected and corrected prior to fabrication of the actual processor.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 shows multiple code streams that are formed by a multiple instruction code stream generator circuit of FIG. 1.

FIG. 4 is a combined code stream that is generated by an interleaver circuit of FIG. 1.

FIG. 6A is a chart showing contents of an issue queue of FIG. 5 after a first fetch of instructions.

FIG. 6B is a chart showing contents of the issue queue of FIG. 5 after a second fetch of instructions.

FIG. 6C is a chart showing contents of the issue queue of FIG. 5 after a third fetch of instructions.

FIG. 6D is a chart showing contents of the issue queue of FIG. 5 after a fourth fetch of instructions.

FIG. 7 is a chart showing issue times for each of the instructions of the combined code stream of FIG. 4 when executed by the simulation system of FIG. 5.

DETAILED DESCRIPTION OF A PREFERRED EMBODIMENT

An embodiment of the invention is directed to a technique for producing a test executable that can stress both the superscaler and out-of-order capabilities of a processor design. The test executable is created from a combined instruction stream having interleaved portions of multiple instruction streams.

Figure 1:
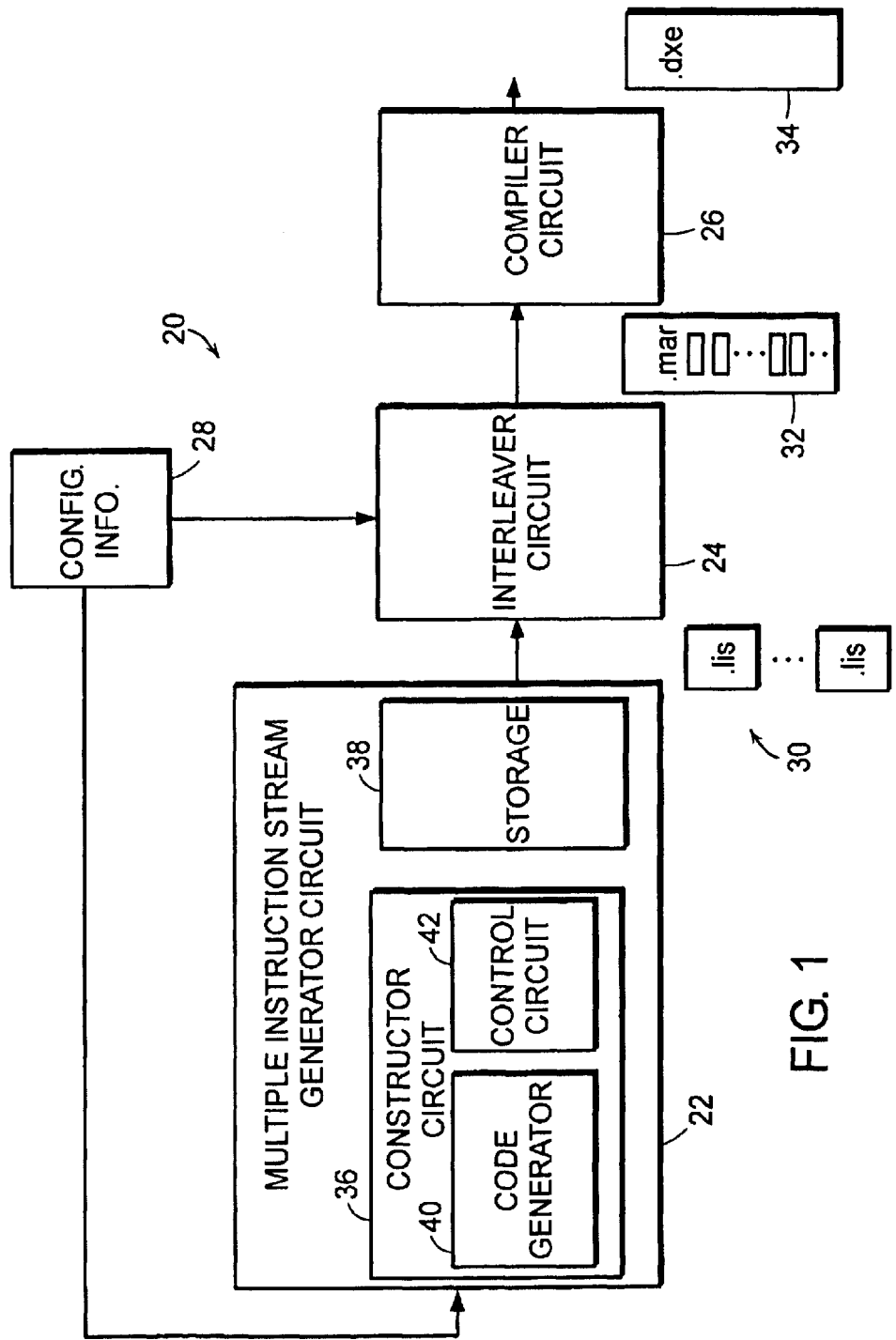
FIG. 1 is a block diagram of an apparatus for producing a test executable.
Figure 2:
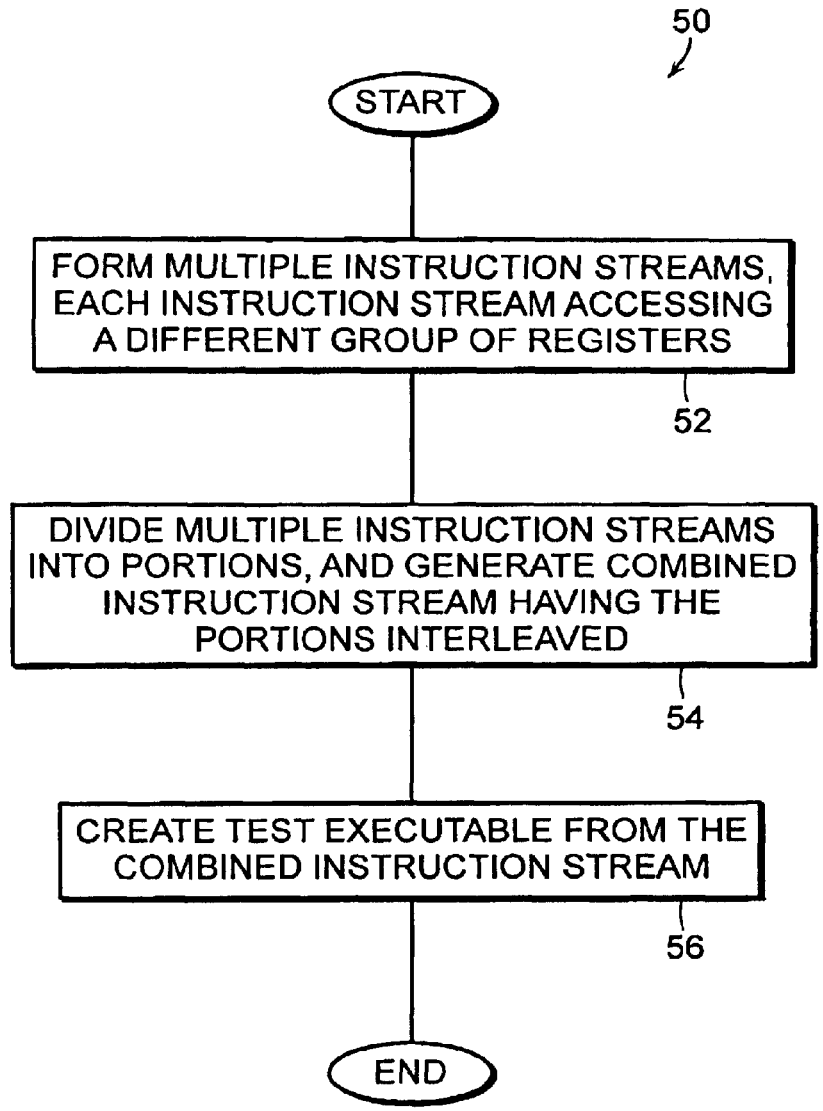
FIG. 2 is a flow diagram of a method for producing a test executable.

Reference is now made to the drawings wherein the same reference numbers are used throughout multiple figures to designate the same or similar components. FIG. 1 shows an apparatus 20 for producing the test executable. The apparatus 20 includes a multiple instruction stream generator circuit 22, an interleaver circuit 24 and a compiler circuit 26. As will now be explained, the circuits of the apparatus 20 perform a method 50 as shown in FIG. 2.

In step 52, the multiple instruction stream generator circuit 22 forms multiple instruction streams, and stores the instruction streams in respective files 30 (e.g. .lis files). The instruction streams access different groups of registers as indicated by configuration information 28 that is received by the multiple instruction stream generator circuit 22.

In step 54, the interleaver circuit 24 divides the multiple instruction streams into portions, and generates a combined instruction stream having the portions interleaved. The combined instruction stream is stored within a file 32 (e.g., a mar file). The number of instructions in each portion is controlled by the configuration information 28.

In step 56, the compiler circuit 26 creates a test executable from the combined instruction stream. In particular, the compiler circuit compiles the combined instruction stream, and stores the test executable as a file 34 (e.g., a .dxe file). Such an executable is suitable for execution by a simulated processor or an actual processor.

Further details of the multiple instruction stream generator circuit 22 will now be provided. The multiple instruction stream generator circuit includes a constructor circuit 36 and a storage device 38 (e.g., disk memory), as shown in FIG. 1. The constructor circuit 36 includes a code generator 36 and a control circuit 42. The control circuit 42 operates the code generator to form the multiple instruction streams. Preferably, the control circuit 42 can run the code generator 36 to produce a single instruction stream, makes multiple copies of the single instruction stream, and modifies the copies such that they access different groups of registers based on the configuration information 28. Alternatively, the control circuit 42 runs the code generator 40 multiple times to form the multiple instruction streams that access the different groups of registers. The constructor circuit 36 stores the multiple instruction streams within the files 30 in the storage device 38.

It should be understood that the apparatus 20 is preferably a general purpose computer having code for producing the test executables. In particular, the code controls the general purpose computer such that it functions at various times as the multiple instruction stream generator 22, the interleaver circuit 24 and the compiler circuit 26. Alternatively, the apparatus 20 may be a specialized apparatus designed specifically to perform the method 50 of FIG. 2.

The operation of the apparatus 20 will be further explained by way of example. FIG. 3 shows four instruction streams (STREAM A, STREAM B, STREAM C and STREAM D) that can be formed by the multiple instruction stream generator circuit 22. The configuration information 28 that is used by the multiple instruction stream generator circuit 22 controls-particular aspects of the multiple instruction streams such as the number of streams that are formed, their length (the number of instructions within each stream), which registers are accessed by each instruction stream, and the type of instructions within each instruction stream (e.g., load, add, shift, etc).

The instructions within STREAM A access a first group of registers, namely R01 through R08. The instructions following Instruction 1 have strong dependencies on preceding instructions. For example, Instruction 1 writes to R01, and Instruction 2 reads from R01. Accordingly, Instruction 1 must complete writing to R01 before Instruction 2 can read from R0. In a similar manner, Instruction 3 depends from Instructions 1 and 2, and so on.

STREAM B, STREAM C and STREAM D include instructions that are arranged in a manner similar to that of STREAM A, except that these instruction streams access different groups of registers. In particular, STREAM B accesses registers R09 through R16, STREAM C accesses registers R16 through R24, and STREAM D accesses registers R25 through R32. Each instruction stream formed by the multiple instruction stream generator circuit 22 is stored, at least temporarily, in the storage device 38 for use by the interleaver circuit 24.

FIG. 4 shows a combined instruction stream that is generated by the interleaver circuit 24 from the instruction streams shown in FIG. 3. The interleaver circuit 24 divides the instruction streams into portions, and then interleaves the portions to generate the combined instruction stream. The configuration information 28 controls the size and ordering of the portions within the combined instruction stream. As shown in FIG. 4, the first five instructions of the combined instruction stream are from a portion of STREAM A (see FIG. 3). Similarly, the next five instructions of the combined instruction stream are from a portion of STREAM B, and so on.

The manner of interleaving is based on the configuration information 28. In particular, the interleaver circuit 24 can generate the combined instruction stream such that it cycles through portions of STREAM A, STREAM B, STREAM C and STREAM D. Such an arrangement of portions is considered to be a round-robin ordering of the portions. Alternatively, the interleaver circuit 24 can generate the combined instruction stream such that it includes portions of the streams in a pseudo random order.

After the interleaver circuit 24 generates the combined instruction stream, the compiler circuit 26 compiles the combined instruction stream to create a test executable that is suitable for execution on either a simulated processor or an actual processor.

Figure 5:
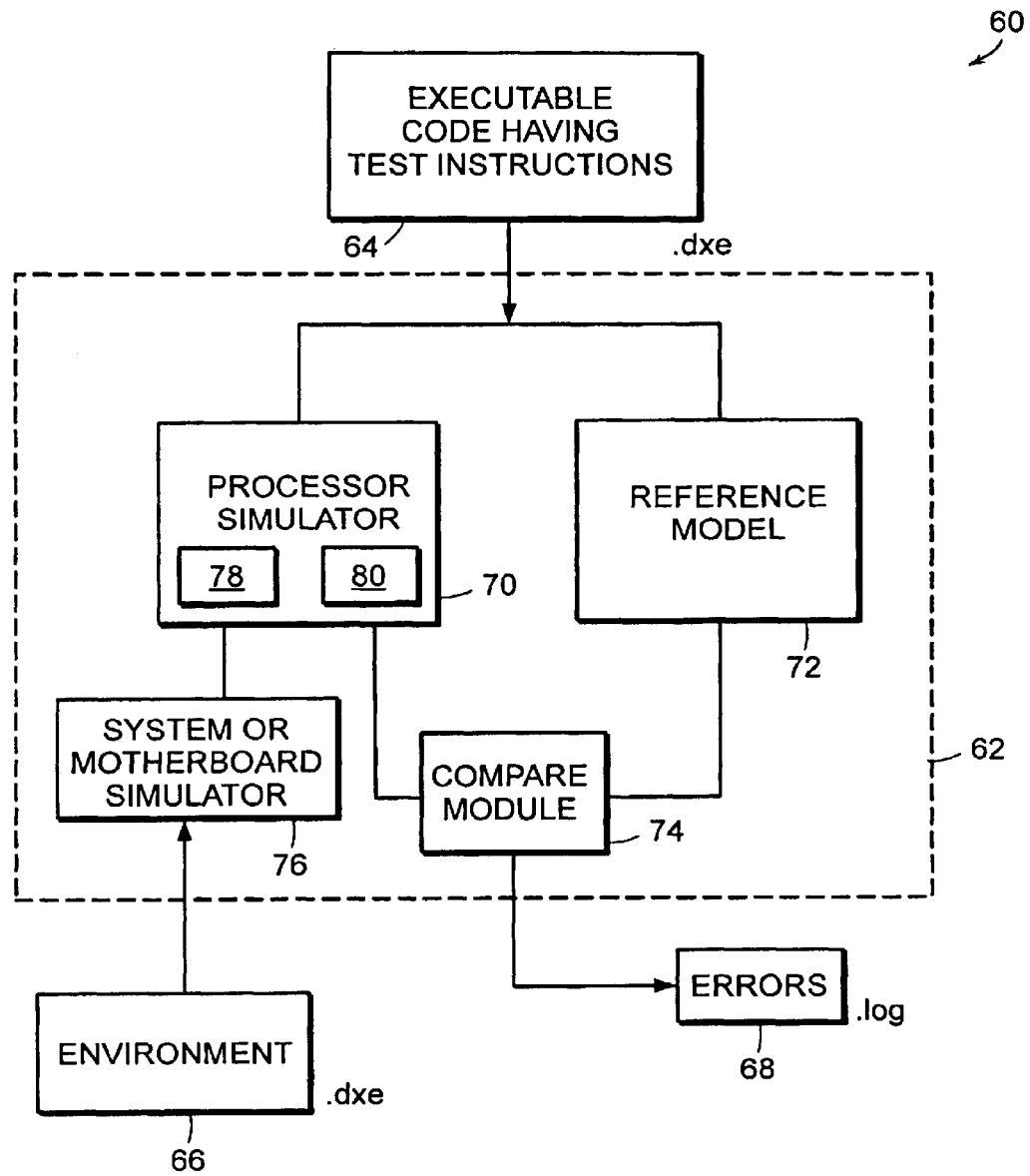
FIG. 5 is a block diagram of a simulation system for testing a simulated processor using a test executable that is created by the apparatus of FIG. 1.

Another embodiment of the invention is directed to a simulation system 60 that is suitable for executing the created test executable 34. As shown in FIG. 5, the simulation system 60 includes a simulation device 62 that receives a test executable 64 (e.g., executable code such as the test executable 34 of FIG. 1) and environment information 66 (e.g., a .dxe file), simulates execution of the test executable, and provides results 68 of the execution (e.g., a log file).

As shown in FIG. 5, the simulation device 62 includes a processor simulator module 70, a reference model module 72, a system or motherboard simulator module 76, and a compare module 74. The processor simulator module 70 operates according to processor design information and is connected with the system or motherboard simulator module 76 which simulates environmental conditions (e.g., provides external clock rates).

During simulation, the test executable 64 is executed by both the processor simulator module 70 and the reference model module 72. The processor simulator module 70 includes a simulated issue queue 78, and a simulated execution stage 80 having multiple simulated execution units and processor registers. As the processor simulator module 70 executes the test executable 64, results of the execution are passed to the compare module 74. Similarly, the reference model module 72 determines what the correct results of execution should be, and passes the correct results to the compare module 74. The compare module 74 matches the results from both the processor simulator module 70 and the reference model 72, and points out discrepancies in the results as an error output 68 (e.g., the .log file).

The operation of the simulation system 60 will be described further by way of example. This example involves testing a superscaler out-of-order processor that is capable of speculatively issuing and executing instructions. FIGS. 6A through 6D show the contents of the simulated issue queue 78 of the processor simulator module 70, after the occurrence of various multi-instruction fetches of the test executable 34 (i.e., the test executable created by compiling the combined code stream of FIG. 4). In particular, in FIG. 6A, the simulated issue queue 78 loads the first four instructions of the test executable 34 during an initial processor cycle (time 0). Since Instruction 1 is the first instruction and does not depend on any other instruction, Instruction 1 is free to issue. However, Instructions 2, 3 and 4 cannot issue due to their RAW dependencies with Instruction 1. Accordingly, during the next processor cycle (time 1), only Instruction 1 will issue (indicated by the rectangle around Instruction 1).

As shown in FIG. 6B, Instruction 1 is removed from the simulated issue queue 78 after issuing in time 1. Additionally, the remaining three instructions are advanced in their queue positions, and the next four instructions of the test executable 34 are fetched and loaded into the simulated issue queue 78. At this point, Instruction 2 can issue since the simulated processor is capable of issuing instructions speculatively. However, Instructions 3, 4 and 5 cannot issue since they have RAW dependencies with Instruction 2. Instructions 6, 7 and 8 do not depend on these previously fetched instructions. Rather, Instruction 6 has no dependencies, and Instructions 7 and 8 have RAW dependencies with Instruction 6. Although Instruction 6 can issue, Instructions 7 and 8 cannot issue because of their instruction dependencies. Accordingly, in the next processor cycle (time 2), Instructions 2 and 6 issue while the other queued instructions must wait.

At this point, it should be understood that the test executable 34 has begun to stress both the superscaler and out-of-order capabilities of the processor simultaneously. In particular, two instructions (Instructions 2 and 6) have issued for simultaneous execution to test the simulated processor's superscaler feature. Additionally, Instruction 6 (stored in issue queue position 5) is issued out-of-order to test the simulated processor's out-of-order feature.

As shown in FIG. 6C, Instructions 2 and 6 are removed from the simulated issue queue 78 after issuing in time 2. Additionally, the remaining instructions are advanced in their queue positions, and the next four instructions of the test executable are fetched and loaded into the simulated issue queue 78. Instructions 3 and 7 can issue since the processor supports speculative execution. Additionally, Instruction 11 has no dependencies and can issue. The rest of the instructions have RAW dependencies with other instructions in the issue queue and must wait. Accordingly, Instructions 3, 7 and 11 issue simultaneously in the next processor cycle (time 3). As shown in FIG. 6C, three instructions are issued from various positions within the issue queue 78 such that both the superscaler and out-of order features of the simulated processor are stressed.

As shown in FIG. 6D, Instructions 3, 7 and 11 are removed from the simulated issue queue 78 after issuing in time 3. Furthermore, the remaining instructions are advanced in their queue positions, and the next four instructions of the test executable are fetched and loaded into the simulated issue queue 78. Instructions 4, 8 and 12 can issue if the processor supports speculative execution. Additionally, Instruction 16 has no dependencies and can issue. The rest of the instructions have RAW dependencies with other instructions in the issue queue and must wait. Accordingly, Instructions 4, 8, 12 and 16 issue simultaneously in the next processor cycle (time 4). It should be understood that four instructions are issued from various positions within the issue queue 78 such that both the superscaler and out-of-order features of the simulated processor are further stressed.

It should be clear from a comparison of FIGS. 6A through 6D that execution of the test executable 34 results in instructions issuing from a variety of different locations within the issue queue 78. Accordingly, the out-of order capabilities of the processor are well tested.

In some processors, the issue queue receives instructions at a first end, and scans for instructions to issue beginning at the opposite end. For such processors, the instructions migrate from the first end of the issue queue to the opposite end. The test executable 34 is well suited for testing such a processor. In particular, queued instructions issue from positions throughout the issue queue as they migrate from the first end of the issue queue to the opposite end.

FIG. 7 shows the instructions within test executable created from the combined instruction stream of FIG. 4, with their respective fetch (F), issue (I), execute (E) and retire (R) times. As illustrated, multiple instructions issue and execute simultaneously and out-of-order thereby stressing the superscaler and out-of-order capabilities of the simulated processor. Similar results occur when running the test executable 34 on an actual processor.

Furthermore, the test executable can run on a processor without speculative execution capabilities. In this situation, more fetches must occur to further fill the issue queue with instructions without dependencies before the processor's superscaler capabilities are stressed. Otherwise, the processor behaves in a manner similar to that above for a processor capable of issuing and executing speculatively.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, special instructions (e.g., instructions that cause conflicts) may be inserted within the combined instruction streams generated by the interleaver circuit 24 to cause various situations to occur. For example, LOAD instructions may be inserted within the combined instruction stream such that cache misses occur during execution. This would more fully stress the processor's out-of-order capabilities. As an alternative to inserting conflict instructions within the combined instruction stream, the conflict instructions can replace instructions within the combined instruction stream. Such insertions or replacements can be controlled by setting parameters within the configuration information 28.

Additionally, the groups of registers can be modified such that the different groups overlap. For example, STREAM A and STREAM B can be formed such that both instruction streams access register R08. Such a modification provides an opportunity for inter-stream communication. Another way of adding inter-stream communication is to make multiple streams access overlapping memory spaces. Such features can be controlled by setting parameters within the configuration information 28.

Some processors treat registers identified within instructions as logical registers, and internally map the logical registers of instructions to physical registers. This operation is called register renaming. The test executable produced by the above described technique is suitable for testing such processors. In particular, running the test executable on such a processor would stress that processor's renaming features simultaneously with its superscaler and out-of-order features. To enhance testing of the register renaming capabilities of the processor, more instruction streams should be added or the different register groups should be widened such that each logical register is accessed by at least one instruction stream.

Furthermore, it should be understood that particular aspects of the combined instruction stream can be changed. For example, the number of instruction streams formed by the multiple instruction stream generator circuit 22 can be more or less than four (as shown in the example of FIG. 3). Similarly, the instruction types and the lengths of the instruction stream portions can be changed as well. Accordingly, processor designers can produce multiple test executables that stress various combinations of particular processor features, at different times.

What is claimed is:

1. A method for producing a test executable in a computer, the test executable intended for testing a superscalar processor that is capable of executing multiple instructions simultaneously and capable of executing such instructions in an order which is different from a program order, the method comprising the steps of:

forming multiple instruction streams;

dividing the multiple instruction streams into portions, and generating a combined instruction stream having the portions interleaved; and creating a test executable from the combined instruction stream.

2. The method of claim 1, wherein the step of forming includes the step of:

constructing the multiple instruction streams such that the multiple instruction streams access different groups of registers.

3. The method of claim 2, wherein the step of constructing includes the step of:

operating a code generator such that the code generator provides each of the multiple instruction streams.

4. The method of claim 2, wherein the step of constructing includes the steps of:

operating a code generator such that the code generator provides a particular instruction stream; and forming other instruction streams according to the particular instruction stream.

5. The method of claim 1, wherein the step of dividing and generating includes the step of:

interleaving the portions within the combined instruction stream such that the portions alternate in a round-robin manner.

6. The method of claim 1, wherein th step of dividing and generating includes the step of:

interleaving the portions within the combined instruction stream such that the portions alternate in a pseudo random manner.

7. The method of claim 1, further comprising the step of:

prior to creating the test executable, including conflict instructions within the combined instruction stream such that the test executable performs stall operations respectively corresponding to the conflict instructions when the test executable is executed.

8. The method of claim 1, wherein the step of forming includes the step of:

constructing the multiple instruction streams such that the multiple instruction streams access common registers.

9. The method of claim 1, wherein the step of forming includes the step of:

constructing the multiple instruction streams such that the multiple instruction streams access common memory spaces.

10. An apparatus for producing a test executable, the test executable intended for testing a superscalar processor that is capable of executing multiple instructions simultaneously and capable of executing such instructions in an order which is different from a program order, the apparatus comprising:

a multiple instruction stream generator circuit that forms multiple instruction streams;

an interleaver circuit, coupled to the multiple instruction stream generator circuit, that divides the multiple instruction streams into portions, and generates a combined instruction stream having the portions interleaved; and an compiler circuit, coupled to the interleaver circuit, that creates a test executable from the combined instruction stream.

11. The apparatus of claim 10, wherein the multiple instruction stream generator circuit includes:

a constructor circuit that constructs the multiple instruction streams such that the multiple instruction streams access different groups of registers.

12. The apparatus of claim 11, wherein the constructor circuit includes:

a code generator; and a control circuit that operates the code generator such that the code generator provides each of the multiple instruction streams.

13. The apparatus of claim 11, wherein the constructor circuit includes:

a code generator; and a control circuit that operates the code generator to from a particular instruction stream, and the forms other instruction streams from the particular instruction stream.

14. The apparatus of claim 10, wherein the interleaving circuit includes:

a control circuit that interleaves the portions within the combined instruction stream such that the portions alternate in a round-robin manner.

15. The apparatus of claim 10, wherein the interleaving circuit includes:

a control circuit that interleaves the portions within the combined instruction stream such, that the portions alternate in a pseudo random manner.

16. The apparatus of claim 10, further comprising:

an instruction insertion circuit that includes conflict instructions within the combined instruction stream such that the test executable performs stall operations respectively corresponding to the conflict instructions when test executable is executed.

17. The apparatus of claim 10, wherein the multiple instruction stream generator circuit includes:

a constructor circuit that constructs the multiple instruction streams such that the multiple instruction streams access common registers.

18. The apparatus of claim 10, wherein the multiple instruction stream generator circuit includes:

a constructor circuit that constructs the multiple instruction streams such that the multiple instruction streams access common memory spaces.

* * * * *